United States Patent [19]

Papke et al.

[11] Patent Number: 5,011,618
[45] Date of Patent: Apr. 30, 1991

[54] PROCESS FOR PRODUCING AN OVERBASED SULFONATE

[75] Inventors: Brian L. Papke, Wappingers Falls; Leonard S. Bartley, Jr., Newburgh, both of N.Y.

[73] Assignee: Texaco Inc., White Plains, N.Y.

[21] Appl. No.: 402,283

[22] Filed: Sep. 5, 1989

[51] Int. Cl.$^5$ .................................... C10M 135/10
[52] U.S. Cl. ........................... 252/33; 252/25; 252/18; 252/33.4
[58] Field of Search ............... 252/38, 39, 18, 25, 252/33, 33.4

[56] References Cited

U.S. PATENT DOCUMENTS

| | | | |
|---|---|---|---|
| 4,387,033 | 6/1983 | Lenack | 252/18 |
| 4,427,559 | 1/1984 | Whittle | 252/33.2 |
| 4,541,940 | 9/1985 | Spence | 252/33 |
| 4,560,489 | 12/1985 | Muir | 252/18 |
| 4,597,880 | 7/1986 | Eliades | 252/18 |
| 4,604,219 | 8/1986 | Whittle | 252/33 |

Primary Examiner—Jacqueline V. Howard
Attorney, Agent, or Firm—Robert A. Kulason; James J. O'Loughlin; Vincent A. Mallare

[57] ABSTRACT

An improvement is provided in a process for making a calcium sulfonate wherein a calcium base/calcium sulfonate mixture is mixed, stirred, reacted with $CO_2$, and filtered to produce the sulfonate product. The improvement comprises stirring the calcium base/calcium sulfonate mixture at variable speeds over a sufficient length of time, whereby the product's filterability is enhanced and viscosity reduced.

4 Claims, 1 Drawing Sheet

PROCESS FOR PRODUCING AN OVERBASED SULFONATE

BACKGROUND OF THE INVENTION

This invention relates to overbased sulfonates, and more particularly to an improved process for producing calcium sulfonates with an enchanced filterability and reduced viscosity.

Calcium sulfonate additives are generally produced by carbonating a hydrocarbon solution of a "neutral" calcium sulfonate, a calcium base (usually calcium hydroxide and/or calcium oxide), and various reaction promoters including a low molecular weight alcohol (especially methanol), water and calcium chloride. During the overbasing process the calcium base is converted to calcium carbonate and incorporated into small inverted micellar structures. These basic calcium sulfonate micelles effectively allow the calcium base to be solubilized in an oil medium, i.e. the lubricating oil. The final product must be filtered to remove unreacted solids, particularly since an excess of the calcium base is typically utilized to prevent a phenomenon termed "overcarbonation" which results in an unacceptable product. The final product (typically a 50% oil concentrate) must also be fluid enough that it can be easily handled and blended into finished lubricant formulations.

Filterability and product viscosity are often the two primary concerns in developing an acceptable overbasing process, and a number of attempts to control these properties have been made and described. For example, U.S. Pat. No. 4,387,033 describes an overbasing process in which the reaction temperatures are carefully controlled and several carbonation stages are employed. In particular, the first carbonation step is carried out at 25°-30° C., and water is added as a critical ingredient. In addition, U.S. Pat No. 4,604,219 describes an overbasing process utilizing CaO as the base with a continuous and uniform addition of water over the entire carbonation period. It was found here also that the rate of water addition and the amount were critical to the production of a product with acceptable filterability and final viscosity.

Thus, it is an object of the present invention to provide a process for producing an overbased sulfonate having a better filterability and a reduced viscosity.

DISCLOSURE STATEMENT

U.S. Pat. No. 4,427,559 discloses a method of preparing overbased calcium sulfonates utilizing a mixture of calcium oxide bases to improve sulfonate and lime utilization.

U.S. Pat. No. 4,387,033 discloses an overbasing procedure using a narrowly defined reaction temperature profile to improve product viscosity as well as improve filterability.

U.S. Pat. No. 4,541,940 discloses the use of a specific type of stirring/mixing process to produce overbased sulfonates, a stirred vortex tank reactor.

Co-assigned Patent Application No. 07/346,791 discloses an overbasing process for calcium sulfonates using a mixture of calcium oxide and calcium hydroxide bases with a critical addition of small amounts of water at the beginning of the carbonation step. The water addition reduces final product viscosity.

SUMMARY OF THE INVENTION

The present invention provides an improved process for the manufacture of a highly basic calcium sulfonate, useful as a detergent additive in gasoline and diesel lubricant formulations to neutralize acids and inhibit sludge formation. Specifically, this invention is directed to improving the filterability and viscosity of a 400 Total Base Number (TBN) calcium sulfonate.

The present improvement is provided in a process for preparing an overbased oil soluble calcium sulfonate having a TBN of 400 to 450 in which calcium base is added to a diluted calcium sulfonate mixture and stirred for a sufficient length of time at a temperature of 50° to 60° C., and $CO_2$ is added to the heated mixture which is filtered to recover the product sulfonate. In this process, the improvement comprises stirring the calcium base/calcium sulfonate mixture at a variable tip speed ranging from a high tip speed sufficient to ensure full $CO_2$ reactivity for a period of time until the $CO_2$ reactivity of the sulfonate mixture increases at which time the tip speed is reduced to the lowest tip speed at which full $CO_2$ reactivity is maintained until said $CO_2$ has reacted with 75% to 85% of the calcium base in said sulfonate mixture, whereby the product's filterability is enhanced and viscosity reduced.

BRIEF DESCRIPTION OF THE DRAWINGS

The present invention will be more clearly understood when considering the detailed description in conjunction with the drawings in which.

DETAILED DESCRIPTION OF THE INVENTION

Figure 1:
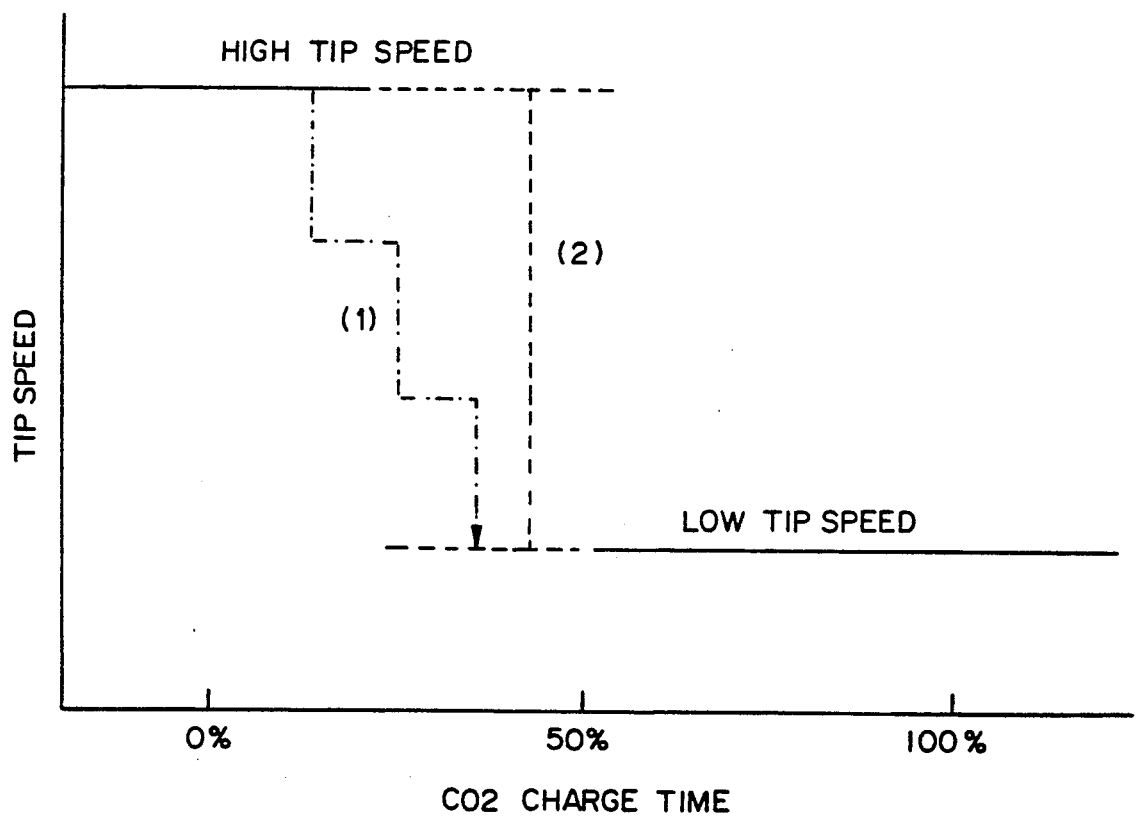
FIg. 1 is a graph illustrating the variation of the "tip speed" with the carbon dioxide charge time.

The general procedure, in which the present improvement is provided, is for preparing oil-soluble overbased calcium sulfonate additives in the 400–450 TBN range involving the addition of gaseous carbon dioxide to a heated (50°-60° C.) mixture of calcium base (hydroxide and/or oxide), a neutral calcium sulfonate or sulfonic acid, a hydrocarbon solvent and a reaction promoter (generally methanol). The present improvement consists of utilizing a variable mixing speed procedure: (a) a high mixing speed early in the reaction to ensure high $CO_2$ reactivity and efficient solids suspension during the early stages of the reaction, and (b) a low mixing speed later in the reaction, resulting in significant reductions in both filtration times and viscosity of the final product. A high mixing speed (high tip speed) is used initially to prevent $CO_2$ loss and maintain solids suspension. However, as the reaction proceeds, $CO_2$ reactivity increases and the remaining solids decrease. A high mixing speed is no longer required, and in fact is detrimental. Lower mixing speeds (low tip speeds) result in a 30% filtration rate reduction for the crude product, and a 50% reduction in final product viscosity.

As indicated above, the present process is directed toward improving the filterability and reducing the viscosity of an overbased calcium sulfonate that is useful in lubricants. The improvement of the invention is provided in a process for preparing an overbased oil soluble calcium sulfonate having a TBN of 400 to 450 in which calcium base is added to a diluted calcium sulfonate mixture and stirred for a sufficient length of time at a temperature of 50° to 60° C., while $CO_2$ is charged to the heated mixture in amounts sufficient to react with 75-85% of the base at which point the mixture is filtered to separate and recover the product sulfonate. The improvement in this process comprises stirring the calcium base/calcium sulfonate mixture at a variable tip speed ranging from a high tip speed sufficient to ensure full $CO_2$ reactivity for a period of time until the $CO_2$ reactivity of the sulfonate mixture increases at which time the tip speed is reduced to the lowest tip speed at which full $CO_2$ reactivity is maintained until the $CO_2$ has reacted with 75-85% of the calcium base in the sulfonate mixture, whereby the product's filterability is enhanced and viscosity reduced.

According to the present invention the calcium base material may be either calcium hydroxide [$Ca(OH)_2$] or calcium oxide ($CaO$) or a mixture of the two.

The calcium base and sulfonate mixture may be mixed at variable tip speeds ranging from a high tip speed of about 4.5 to about 7.0 feet/second or a high tip speed sufficient to ensure full $CO_2$ reactivity for a period of time until the $CO_2$ reactivity increases. At this time the tip speed may be reduced to the lowest tip speed at which full $CO_2$ reactivity is maintained until the $CO_2$ has reacted with 75-80% of the calcium base in the sulfonate mixture.

The lowest tip speed at which the sulfonate mixture may be mixed to maintain the $CO_2$ reactivity ranges from about 2.4 to about 2.9 feet/second and preferably 2.7 feet/second.

The primary advantage of the present "variable tip speed" process over a constant mixing process is that the crude product's filterability is enhanced and the final product's viscosity is reduced. According to the present invention, the product filtration rate is enhanced by about 30% and viscosity is reduced by more than about 50%.

None of the known teachings dealing with the manufacture of overbased sulfonate additives assign any special significance to the stirring rate or mixing conditions employed. However, it is generally well known that a slow mixing speed results in large and uncontrollable $CO_2$ losses during the overbasing process, and may not be sufficient to maintain adequate solids suspension, while too high of a mixing speed results in a high viscosity products and/or poor filterability. To our knowledge, the use of a variable stirring speed process has not been considered prior to this disclosure. We have discovered that if a high stirring speed (high shear stress) is employed during the warm-up and through the initial stages of the carbonation reaction, the stirring speed may then be gradually reduced to much lower speeds (low shear stress) without a significant loss of $CO_2$. The lower shear stress (particularly near the end of the overbasing reaction for 400 TBN, 20:1 overbased sulfonates) results in a product that filters more readily and is more fluid than if a constant mixing speed is used. This variable mixing speed process has been found to operate for a variety of overbasing procedures, including overbasing reactions which utilize 100% calcium hydroxide as the base and reactions utilizing mixtures of calcium oxide and calcium hydroxide.

Conspicuously absent from known teachings is any mention of the mixing conditions employed in the reaction. In fact, none of the known processes dealing with the manufacture of overbased sulfonate additives assign any significance to the stirring rate or mixing conditions employed. In a typical overbasing process, a large number of different phases are present and must be brought into contact if a reaction is to occur. One or two solid phases are present (the calcium hydroxide and calcium oxide), two liquid phases (the hydrocarbon solvent and a water/methanol phase), a gas phase ($CO_2$), and the "neutral" calcium sulfonate starting material (which itself is in a micellar state, capable of solubilizing water and/or methanol). The mixing process must be capable of keeping the solids in suspension and adequately dispersing the gas and liquid phases to effect liquid-solid, liquid-liquid and gas-liquid mass transfer.

It may be assumed that prior teachings employed constant mixing speeds, presumably with a variety of impeller designs. The optimum mixing speed for a particular reactor is determined empirically; if the mixing speed is too low, the $CO_2$ gas phase will not be dispersed well enough to completely react before it escapes from the system, if the mixing speed is too fast the final product filters poorly and/or has an unacceptably high viscosity. Slower mixing speeds give products which are generally more fluid and filter better, however, the loss of $CO_2$ gas is undesirable since the total amount of $CO_2$ charged to the system is critical, and there is no accurate method of measuring the total amount of unreacted $CO_2$ which may escape from the system. If too little $CO_2$ is added, the final product will not reach the desired TBN, too much $CO_2$ (typically more than 90% of the amount required to stoichiometrically react with the calcium base) and an unacceptable final product is obtained (unfilterable, hazy, low TBN, extremely viscous etc.). Typically, this product also contains crystalline calcium carbonate.

It has been discovered that the reactivity of a typical overbasing system with respect to $CO_2$ is not constant over the course of the overbasing process. Initially, the reaction mixture is less reactive to $CO_2$, and the $CO_2$ must be highly dispersed if complete reaction is to occur. However, it has been found that the $CO_2$ reactivity increases during the overbasing reaction, and as the reaction proceeds it is no longer necessary to disperse the $CO_2$ as vigorously. Effectively, what has been found is that the mass transfer rate for the gas-liquid-solid dispersion increases throughout the overbasing reaction. While a high mixing rate (with a correspondingly high shear stress) is required during the initial carbonation stages, a lower mixing rate (and lower shear stress) may be utilized during the later stages of the carbonation process. Therefore, the mixing speed may be reduced during the carbonation process with no appreciable loss of $CO_2$ occurring. The lower mixing speed has the effect of increasing the crude product filtration rate and reducing the final product viscosity.

To understand how the mixing speed effects sulfonate filterability and viscosity, we have to consider that mixing processes involve both flow and various levels of fluid shear rate and turbulence. The only way that particles can intermingle in a mixing tank is by having a shear rate. The mixing process inherently involves shear rates since layers of fluid and solids intermix because of velocity differences. For every shear rate there is a corresponding shear stress, which is the product of the shear rate times the fluid viscosity. It is the shear stress that is responsible for dispersing the $CO_2$ gas bubbles, breaking up solid particles and producing the small-scale intermixing that actually is the mixing process. The most vigorous shear stress occurs in a typical overbasing process is as fluid is discharged from the impeller, and both the average and maximum shear stress are functions of the impeller speed.

The maximum shear stress is a function of both the speed and diameter of the impeller, and tends to follow the peripheral speed of the impeller (called the "tip speed"). The tip speed is related to the impeller RPM (revolutions per minute) by the following equation:

tip speed (ft/sec)=$2\pi r/60$ (RPM)

where r is the impeller radius (measured in feet). It is therefore more appropriate to refer to the tip speed rather than RPM when describing the mixing process, because the tip speed is not dependent on a particular impeller size (or radius).

Having established that the optimum tip speed can be varied in an overbasing reaction from a high initial tip speed to a low tip speed near the end of the $CO_2$ charge time, it is necessary to consider exactly how and when the tip speed may be reduced. The optimum tip speed is dependent on $CO_2$ reactivity, as has been described earlier. The variation of the optimum tip speed with $CO_2$ charge time is graphically illustrated in FIG. 1. The tip speed can be reduced incrementally as indicated by line (1) or in one step as indicated by line (2). The exact time or manner in which the tip speed is reduced is not critical, but it is necessary to maintain a tip speed sufficient to ensure a homogeneous suspension of the solids at all times during the reaction. It is preferable that the tip speed be reduced as early in the reaction as possible while maintaining solids suspension and avoiding $CO_2$ loss.

Calcium sulfonate forms inverted micellar structures in a hydrocarbon medium, and these micelles are known to be capable of solubilizing polar materials such as water and methanol. The neutral calcium sulfonate inverted micelle is also known to be a spherical structure roughly 60 Angstroms in diameter. When polar solvents are solubilized by the sulfonate micelle, they are incorporated into the center polar core of this spherical structure, and the entire micellar structure is known to expand and become less rigid—hence more susceptible to shear stress. Shear stress during the initial heating and first portion of the carbonation process may in fact be beneficial in promoting intimate contact between the various phases (the sulfonate, alcohol and calcium solids). In addition, high mixing speeds are essential to maintain adequate solids suspension early in the overbasing reaction. As the overbasing reaction proceeds, the sulfonate micelles increase in size as increasing amounts of calcium carbonate and hydroxide base are incorporated into the micellar polar core. These partly overbased sulfonate micelles become increasingly susceptible to shear stress as they increase in size, particularly since polar solvents such as water and methanol are still retained within the micellar core. Although shear stress appears to be beneficial during the initial stages of the overbasing process, it is detrimental during the mid- and later overbasing stages. Shear stress tend to break apart the partly formed sulfonate micelles, creating agglomerated sulfonate structures which not only filter very poorly, but also contribute to large increases in the final product viscosity. The variable speed mixing process minimizes the destruction of sulfonate micellar structures by reducing the maximum shear stress in the system during the critical time period when the sulfonate micelles are most susceptible.

The advantages of the present invention are illustrated but not limited to the following examples The concept of a variable mixing speed process can in principle be applied to any overbasing process where the reactivity of the mixture to $CO_2$ increases during the carbonation process. Accordingly, we have used the variable mixing speed procedure to reduce crude product filtration times and final product viscosities in two very different overbasing process. The first process (examples 1 and 2) utilizes 100% calcium hydroxide as the base, while the second process (Examples 3 and 4) utilizes a mixture of calcium oxide and calcium hydroxide with an initial charge of water as a reaction promoter.

EXAMPLE 1

Calcium sulfonate (290 g containing 44 wt% active material) was diluted with heptane (418 g) and methanol (80.3 g) in a 2 liter reaction vessel. A 100–500 SUS @40° C. diluent oil (115 g) was added at this point, although the oil could also be added to the final product just prior to filtration. Calcium hydroxide (246.2 g) was added to the diluted mixture, which was then stirred at 655 RPM using a 2 inch diameter flat blade disk turbine (corresponding to a 5.72 ft/sec tip speed). The mixture was heated to 50° C. for 30 minutes, then heated to 60° C. and gaseous carbon dioxide (114.2 g) was introduced over a three hour period. The reaction mixture was allowed to cool to 50° C. while stirring for an additional 30 minutes. The crude reaction mixture contained 30 percent solids. Filtration rates were determined by diluting 100 cc of the crude product with 100 cc heptane and measuring the total filtration time (including a wash with 50 cc heptane). The filtration apparatus consisted of a Buchner funnel containing a 7 cc Whatman #4 filtration paper and 10.0 g of diatomaceous earth: a ½ atmosphere vacuum was used. A filtration time of 763 seconds was obtained. The filtered and solvent stripped product had a TBN of 420, a Kin Vis @100° C. of 177 cSt. and a calculated sulfonate utilization of 87%.

EXAMPLE 2

Calcium sulfonate (290 g containing 44 wt% active material) was diluted with heptane (418 g) and methanol (80.3 g) in a t liter reaction vessel. A 100–500 SUS @40° C. diluent oil (115 g) was added at this point, although the oil could also be added to the final product just prior to filtration. Calcium hydroxide (246.2 g) was added to the diluted mixture, which was then stirred at 655 RPM using a 2 inch diameter flat blade disk turbine (corresponding to a 5.72 ft/sec top speed). The mixture was heated to 50° C. for 30 minutes, then heated to 60° C. and gaseous carbon dioxide (114.2 g) was introduced over a three hour period. A mixing speed of 655 RPM was maintained for during the first 65 minutes of $CO_2$ addition; the mixing speed was then reduced to 300 RPM (2.62 ft/sec tip speed) over a 25 minute period, with no appreciable loss of $CO_2$. The 300 RPM mixing speed was maintained during the remaining 90 minutes of carbonation. The reaction mixture was then allowed to cool to 50° C. while stirring for an additional 30 minutes at 300 RPM. The crude reaction mixture contained 30 percent solids. Filtration rates were determined by diluting 100 cc of the crude product with 100 cc heptane and measuring the total filtration time (including a wash with 50 cc heptane). The filtration apparatus consisted of a Buchner funnel containing a 7 cc Whatman #4 filtration paper and 10.0 g of diatomaceous earth; a ½ atmosphere vacuum was used. Filtration times of 536 and 533 seconds were obtained. The filtered and solvent stripped product had a TBN of 422, a Kin Vis @100 C of 82 cSt, and a calculated sulfonate utilization of 87%. The filtration rate was 30% less than that in Example 1, and the final product was noticeably more fluid than the product from Example 1.

EXAMPLE 3

Calcium sulfonate (224 g containing 44 wt% active material) was diluted with heptane (637 g) and methanol (55.3 g) in a 2 liter reaction vessel. Calcium chloride (0.45 g) was dissolved in the methanol to promote the calcium oxide hydration reaction. A 100-500 SUS @40° C. diluent oil (70.0 g) was added at this point, although the oil could also be added to the final product just prior to filtration. Calcium hydroxide (65.1 g) and calcium oxide (74.2 g) were added to the diluted mixture, which was then stirred t 655 RPM using a 2 inch diameter flat blade disk turbine (corresponding to a 5.72 ft/sec tip speed). The mixture was heated to 50° C. and stirred for 30 minutes, then heated to 60° C. At this point a small aliquot of water (5.20 g) was charged to the reactor, and gaseous carbon dioxide (75.7 g) was introduced over a three hour period. The reaction mixture was allowed to cool to 50° C. while stirring for an additional 30 minutes, maintaining the initial mixing speed of 655 RPM. The crude reaction mixture contained 15 percent solids. Filtration rates were determined using 200 cc of the crude product (undiluted) and measuring the total filtration time (including a wash with 50 cc heptane). The filtration apparatus consisted of a Buchner funnel containing a 7 cc Whatman #4 filtration paper and 10.0 g of diatomaceous earth; a ½ atmosphere vacuum was used. Filtration times of 625 and 730 seconds were obtained. The filtered and solvent stripped product had a TBN of 416, a Kin Vis @100 C. of 181 cSt, and a calculated sulfonate utilization of 87%.

EXAMPLE 4

Calcium sulfonate (224 g containing 44 wt% active material) was diluted with heptane (637 g) and methanol (55.3 g) in a 2 liter reaction vessel. Calcium chloride (0.45 g) was dissolved in the methanol to promote the calcium oxide hydration reaction. A 100-500 SUS @40.C diluent oil (70.0 g) was added at this point, although the oil could also be added to the final product just prior to filtration. Calcium hydroxide (65.1 g) and calcium oxide (74.2 g) were added to the diluted mixture, which was then stirred at 655 RPM using a 2 inch diameter flat blade disk turbine (corresponding to a 5.72 ft/sec tip speed). The mixture was heated to 50.C and stirred for 30 minutes, then heated to 50° C. At this point a small aliquot of water (5.20 g) was charged to the reactor, and gaseous carbon dioxide (75.7 g) was introduced over a three hour forty minute period. A mixing speed of 655 RPM was maintained for during the first 15 minutes of $CO_2$ addition; the mixing speed was then reduced to 300 RPM (2.62 ft/sec tip speed) over a 75 minute period. Some $CO_2$ loss did occur, therefore the total carbonation time was increased 40 minutes over that in Example 3. The 300 RPM mixing speed was maintained throughout the remaining 100 minutes of carbonation. The reaction mixture was then allowed to cool to 50.C while stirring for an additional 30 minutes at 300 RPM. The crude reaction mixture contained 15 percent solids. Filtration rates were determined using 200 cc of the crude product (undiluted) and measuring the total filtration time (including a wash with 50 cc heptane). The filtration apparatus consisted of a Buchner funnel containing a 7 cc Whatman #4 filtration paper and 10.0 g of distomaceous earth; a ½ atmosphere vacuum was used. Filtration times of 489 and 439 seconds were obtained. The filtered and solvent stripped product had a TBN of 409, a Kin Vis @100 C. of 79 cSt, and a calculated sulfonate utilization of 87%. The filtration rate was 31% less than that in Example 3, and the final product was noticeably more fluid than the product from Example 3.

To more clearly illustrate the advantages of the present invention, calcium sulfonate products of the above four (4) examples are compared below in Table I.

TABLE I

COMPARISON OF CONSTANT MIXING SPEED AND VARIABLE MIXING SPEED PROCEDURES

| | TBN | Mixing Speed | Relative Filtration Time | Product Viscosity |
|---|---|---|---|---|
| 100% Hydroxide Process | | | | |
| Example 1 | 420 | Constant | 763 sec | 177 cSt |
| Example 2 | 422 | Variable | 536, 533 sec | 82 cSt |
| Hydroxide/Oxide Process | | | | |
| Example 3 | 416 | Constant | 625, 730 sec | 181 cSt |
| Example 4 | 409 | Variable | 489, 439 sec | 79 cSt |

We claim:

1. In a process for preparing an overbased oil soluble calcium sulfonate having a TBN of 400 to 450 in which calcium base is added to a diluted calcium sulfonate mixture and stirred for a sufficient length of time at a temperature of 50° to 60° C., and $CO_2$ is added to the heated mixture which is filtered to recover the sulfonate product wherein the improvement comprises stirring the calcium base and calcium sulfonate mixture at a variable tip speed ranging from a high tip speed sufficient to ensure full $CO_2$ reactivity for a period of time until the $CO_2$ reactivity of the sulfonate mixture increases at which time the tip speed is reduced to the lowest tip speed at which full $CO_2$ reactivity maintained until said $CO_2$ has reacted with 75% to 85% of the calcium base in said sulfonate mixture, wherein the sulfonate product's filterability is enhanced and viscosity reduced.

2. In the process of claim 1 wherein the calcium base is calcium hydroxide, calcium oxide or a mixture therof.

3. In the process of claim 1 wherein the calcium base and calcium sulfonate mixture is stirred at a high tip speed of about 4.5 to about 7 ft/sec down to a low tip speed ranging from about 2.4 to about 2.9 ft/sec.

4. In the process of claim 3 wherein the calcium base and calcium sulfonate mixture is stirred at a high tip speed of about 5.7 ft/sec for about 90 minutes and then at a low tip speed of about 2.7 ft/sec for about 150 minutes.

* * * * *